(12) United States Patent
Mustafi et al.

(10) Patent No.: US 12,405,976 B2
(45) Date of Patent: Sep. 2, 2025

(54) METHOD AND SYSTEM FOR GENERATING TRAINING DATA FOR CLASSIFYING INTENTS IN A CONVERSATIONAL SYSTEM

(71) Applicant: HITACHI, LTD., Tokyo (JP)

(72) Inventors: Joy Mustafi, Bangalore (IN); Geet Tapan Telang, Bangalore (IN); Thiruvengadam Samon, Bangalore (IN); Kingshuk Banerjee, Bangalore (IN)

(73) Assignee: HITACHI, LTD., Tokyo (JP)

( * ) Notice: Subject to any disclaimer, the term of this patent is extended or adjusted under 35 U.S.C. 154(b) by 400 days.

(21) Appl. No.: 18/062,632

(22) Filed: Dec. 7, 2022

(65) Prior Publication Data

US 2023/0195765 A1 Jun. 22, 2023

(30) Foreign Application Priority Data

Dec. 16, 2021 (IN) .............................. 202141058729

(51) Int. Cl.
*G06F 16/3329* (2025.01)
*G06F 40/30* (2020.01)
*G06F 40/40* (2020.01)

(52) U.S. Cl.
CPC .......... *G06F 16/3329* (2019.01); *G06F 40/30* (2020.01); *G06F 40/40* (2020.01)

(58) Field of Classification Search
CPC ....... G06F 16/3329; G06F 40/40; G06F 40/30
See application file for complete search history.

(56) References Cited

U.S. PATENT DOCUMENTS 11,314,489 B1 * 4/2022 Chartrand ................. G06F 8/36
11,874,424 B2 * 1/2024 Pan .......................... G01V 3/38
2018/0285418 A1 * 10/2018 Petropoulos ........ G06F 16/3332
(Continued)

OTHER PUBLICATIONS

Bazaga, Translating Synthetic Natural Language to Database Queries: a Polygot Dep Learning Framework, 2021, arXiv, whole document (Year: 2021).*

(Continued)

*Primary Examiner* — Sonia L Gay
(74) *Attorney, Agent, or Firm* — Baker Botts L.L.P.

(57) ABSTRACT

Embodiments of present disclosure relates to method training data generation system for generating training data for classifying intent in conversational system. The training data generation system receives database schema and creates SQL/NoSQL queries. The training data generation system generates natural language queries for the SQL/NoSQL queries. Further, the training data generation system generates training data for intents associated with the natural language queries and provides to classification models associated with conversational system for classification of intents. Embodiments of present disclosure relates to method and conversational system for providing natural language response for query. The conversational system receives query from user and classifies intent of the query and provides relevant response by mapping the query with the SQL/NoSQL queries generated by the training data generation system. Thus, the present disclosure generates conversational system without manually providing training data for classifying intents in real-time.

10 Claims, 11 Drawing Sheets

(56) References Cited

U.S. PATENT DOCUMENTS

2019/0155947 A1* 5/2019 Chu .................. G06F 16/358
2019/0317994 A1  10/2019 Singh et al.
2021/0081819 A1   3/2021 Polleri et al.
2022/0084510 A1*  3/2022 Peng .................. G10L 15/063
2022/0100800 A1*  3/2022 Georgopoulos .... G06F 16/3344

OTHER PUBLICATIONS

Examination Report, dated May 1, 2024, for Indian Application No. 202141058729 (with English translation).

* cited by examiner

METHOD AND SYSTEM FOR GENERATING TRAINING DATA FOR CLASSIFYING INTENTS IN A CONVERSATIONAL SYSTEM

TECHNICAL FIELD

The present subject matter is related in general to a conversation Artificial Intelligence (AI) system and Natural Language Processing (NLP), more particularly, but not exclusively, the present subject matter relates to a method and system for generating training data for classifying intent in a conversational system.

BACKGROUND

At present, conversational Artificial Intelligence (AI) is widely used in speech-enabled applications, assisting customers in a store and so on. The conversational AI is a technology which can be used to communicate like a human by recognizing speech, text of a user and understanding intent of the user in order to mimic human interactions. Generally, to mimic human interactions, the conversational AI is developed using huge amount of unstructured data in natural language. The conversational AI is trained by manually creating domain specific intents for the unstructured data. As a result, limiting number of domains which are created to train the conversational AI to understand the user's query.

Currently, existing conversational AIs are trained by manually creating the domain specific intent for understating the intent of the user for a given query. The existing conversational AI also use predefined templates or predefined responses for providing answer to the user's query. However, the existing conversational AI are unable to accurately understand the intent of the user based on the manually created domain specific intents and provide results for the user's query.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for generating training data for classifying intents in a conversational system. The method comprises receiving structured databases schema. The structured databases schema comprise information related to an enterprise. Upon receiving the structured database schema, the method comprises creating at least one of one or more Structured Query Language (SQL) and not only SQL (NoSQL) queries based on the structured databases schema by using predefined rules. Further, the method comprises converting at least one of the one or more SQL and NoSQL queries into respective one or more natural language queries using a Deep Learning Neural Network (DNN) model. The DNN model is trained using a first knowledge corpus of a specific natural language. Upon converting, the method comprises creating a second knowledge corpus based on the one or more natural language queries and the first knowledge corpus using semantic analysis methodology. Thereafter, the method comprises generating training data for intents associated with each of the one or more natural language queries using the second knowledge corpus. The training data is provided to one or more classification models for classifying an intent in the conversational system.

In an embodiment, the present disclosure relates to a training data generation system for generating training data for classifying intents in a conversational system. The generation system includes a processor and a memory communicatively coupled to the processor. The memory stores processor-executable instructions, which on execution cause the processor to generate training data for classifying intents in the conversational system. The generation system receives structured databases schema. The structured databases schema comprise information related to an enterprise. Upon receiving the structured databases schema, the generation system creates at least one of one or more Structured Query Language (SQL) and not only SQL (NoSQL) queries based on the structured databases schema by using predefined rules. Further, the generation system converts at least one of the one or more SQL and NoSQL queries into respective one or more natural language queries using a Deep Learning Neural Network (DNN) model. The DNN model is trained using a first knowledge corpus of a specific natural language. Upon converting, the generation system creates a second knowledge corpus based on the one or more natural language queries and the first knowledge corpus using semantic analysis methodology. Thereafter, the generation system generates training data for intents associated with each of the one or more natural language queries using the second knowledge corpus. The training data is provided to one or more classification models for classifying an intent in the conversational system.

In an embodiment, the present disclosure relates to a method for providing natural language response to a user for a query using a conversational system. The method comprises receiving a query in a natural language from a user. Upon receiving the query, the method comprises classifying an intent associated with the query by using a classification model associated with the conversational system. The classification model is trained by using the training data generated using generation system. Upon classifying, the method comprises mapping the query with at least one of one or more SQL and NoSQL queries prestored in a database using the classified intent. Further, the method comprises providing a natural language response to the user from the database based on the mapped at least one of the one or more SQL and NoSQL queries.

In an embodiment, the present disclosure relates to a conversational system for providing natural language response to a user for a query. The conversational system includes a processor and a memory communicatively coupled to the processor. The memory stores processor-executable instructions, which on execution cause the processor to provide natural language response to the user for the query. The conversational system receives a query in a natural language from a user. Upon receiving the query, the conversation system classifies an intent associated with the query by using a classification model associated with the conversational system. The classification model is trained by using the training data generated using generation system. Upon classifying, the conversational system maps the query with at least one of one or more SQL and NoSQL queries prestored in a database using the classified intent. Further, the conversational system provides a natural language response to the user from the database based on the mapped at least one of the one or more SQL and NoSQL queries.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1A:
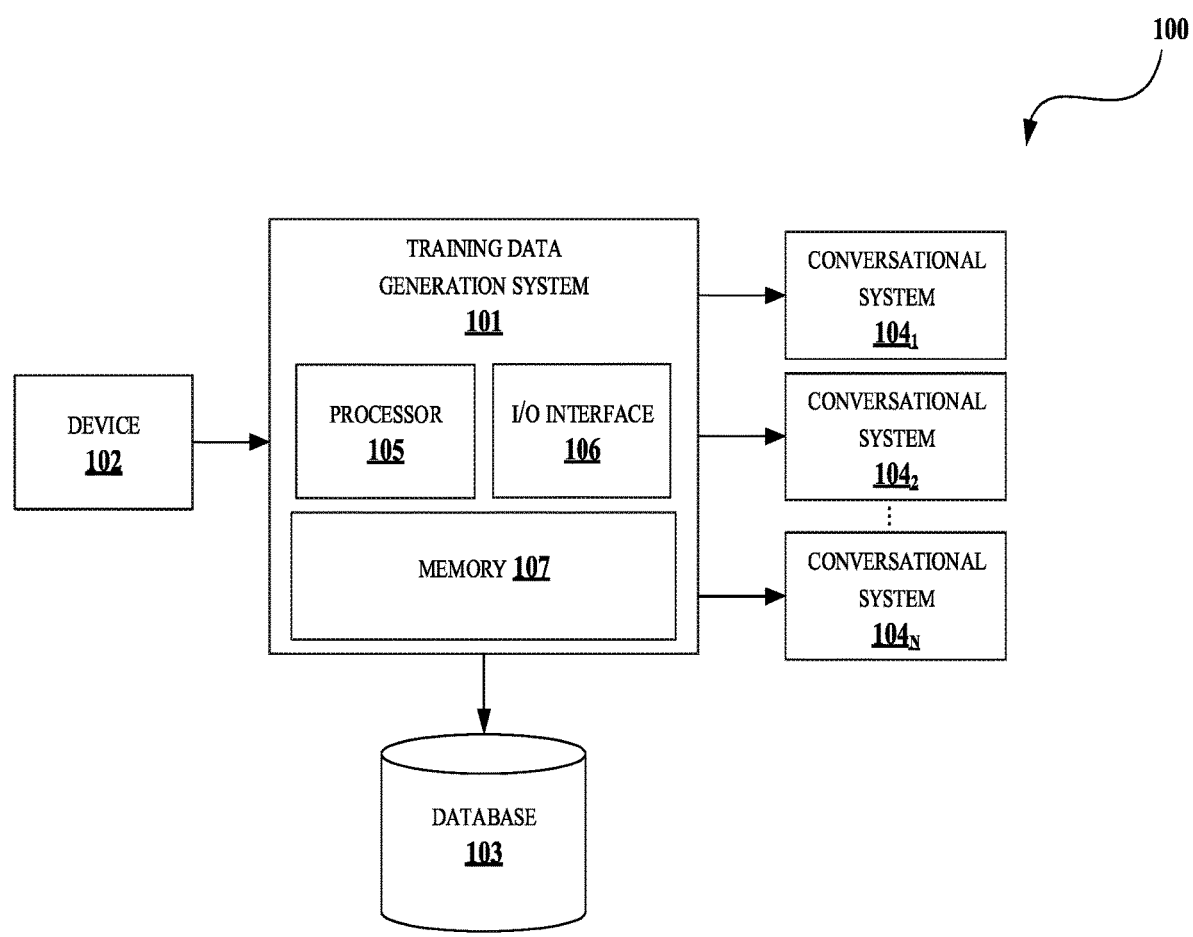
FIG. 1a shows an exemplary environment for generating training data for classifying intents in a conversational system, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Present disclosure relates to a method and training data generation system for classifying intents in a conversational system. The present disclosure utilizes one or more database schema related to an enterprise for dynamically generating intent training data for the conversational system for the enterprise. The generated training data is provided to one or more classification models associated with the conversational system for automatically classifying intents for user queries. As a result, the conversational system is able to provide relevant information for the queries of the users by utilizing classified intents to understand context of the queries. Thus, the present disclosure automatically generates the training data to learn domain specific natural language for understanding user queries and provides relevant response to the user.

FIG. 1a shows an exemplary environment 100 for generating training data for classifying intents in a conversational system. The exemplary environment 100 includes a training data generation system 101, a device 102, a database 103 and one or more conversational systems ($104_1$, $104_2$ ... $104_N$, hereinafter referred as one or more conversational systems 104). In an embodiment, the training data generation system 101 may be implemented in the device 102 associated with a user. The device 102 may include, but not limited to, a laptop computer, a desktop computer, a Personal Computer (PC), a notebook, a smartphone, a tablet, a server, a network server, a cloud-based server, and the like. In an embodiment, the user may interact with the training data generation system 101 via the device 102. Further, the training data generation system 101 may include a processor 105, I/O interface 106, and a memory 107. In some embodiments, the memory 107 may be communicatively coupled to the processor 105. The memory 107 stores instructions, executable by the processor 105, which, on execution, may cause the training data generation system 101 to generate training data for classifying intents, as disclosed in the present disclosure.

In an embodiment, the training data generation system 101 may communicate with the device 102 via a communication network (not show in FIG. 1a). In an embodiment, the communication network may include, without limitation, a direct interconnection, Local Area Network (LAN), Wide Area Network (WAN), Controller Area Network (CAN), wireless network (e.g., using a Wireless Application Protocol), the Internet, and the like. The training data generation system 101 may be in communication with the device 102 for generating training data for classifying intents in the one or more conversational systems 104.

The training data generation system 101 may receive a schema of a structured database from the device 102 associated with the enterprise or from a structured database schema (not shown in FIG. 1a) associated with the enterprise. The structured database schema may comprise information related to the enterprise such as, information related to employees, information related to products/services and the like. Upon receiving the schema of the structured database, the training data generation system 101 may create at least one of, one or more Structured Query Language (SQL) and not only SQL (NoSQL) queries for non-relational databases, based on the schema by using predefined rules. In an embodiment, the predefined rules may be set of instructions or steps which are to be followed for creating the at least one of the one or more SQL and NoSQL queries. The training data generation system 101 may extract details of a plurality of columns from each table of the structured databases schema. Upon extracting, the training data generation system 101 may identify data type corresponding to each of the plurality of columns. The data type may include, but is not limited to, string data type, numeric data type, data-time data type. Upon extracting, the training data generation system 101 may create the at least one of the one or more SQL and NoSQL queries for each of the plurality of columns using the predefined rules associated with respective data type. For example, one of SQL query for the string data type may be "SELECT employee_name FROM employee_details".

The training data generation system 101 may convert the at least one of the one or more SQL and NoSQL queries into respective one or more natural language queries by using a Deep Learning Neural Network (DNN) model. The DNN model is pre-trained using a first knowledge corpus of a specific natural language. The specific natural language may be, but not limited to, English, Hindi, or any regional language. In another embodiment, the first knowledge corpus may be a domain specific natural language corpus. In an embodiment, the training data generation system 101 may obtain information related to the at least one of one or more SQL and NoSQL queries. The information may include details about, but not limited to, types of operations used in the at least one of one or more SQL and NoSQL queries, column names of each table in the at least one of one or more SQL and NoSQL queries, and the data type of each column name. The types of operations may include, but not limited to, group by operation, order by operation, and like. Upon obtaining the information, the training data generation system 101 may normalize the obtained information by using techniques such as, stemming, spelling correction and abbreviation expansion and like. The stemming is a process of reducing a derived word to their word stem. Upon normalizing, the training data generation system 101 may generate the one or more natural language queries by assigning weights and bias to the normalized at least one of the one or more SQL and NoSQL queries by using the DNN model and the first knowledge corpus. In an embodiment, the first knowledge corpus may be a lexical database of semantic relations between words of a specific natural language. Upon generating the one or more natural language queries for respective one or more SQL and NoSQL queries, the training data generation system 101 may create a second knowledge corpus based on the one or more natural language queries and the first knowledge corpus. In an embodiment, the second knowledge corpus may be created using semantic analysis methodology. The second knowledge corpus is a database which may include information related to the one or more natural language queries and semantic relations between words of the one or more natural language queries. The semantic analysis methodology may include, but not limited to, semantic classification and semantic extractors. Upon creating the second knowledge corpus, the training data generation system 101 may generate training data for intents associated with the one or more natural language queries. In an embodiment, the training data generation system 101 may tag information of the second knowledge corpus into one or more dialog tags using N-gram and topic modelling. In an embodiment, the second knowledge corpus is used to generate the training data intents using intent mining methodology which shall provide a general representation of the intent of the user which is not bound to any dialog domain. In an embodiment, the N-gram technique is used to find probability of a word by calculating number of times a word is used in a text. The topic modelling is a technique for automatically clustering words and similar expressions. Upon tagging, the training data generation system 101 may cluster the one or more dialog tags based on predefined parameters. The clustered one or more dialog tags are labelled by the training data generation system 101. Upon clustering and labelling, the training data generation system 101 may generate the training data for the intents. The intents may comprise tags, patterns, responses, and context associated with the one or more natural language queries. Further, upon generating the training data, the training data generation system 101 may store the training data in the database 103 and provide to one or more classification models for classifying intent in real time.

Figure 1B:
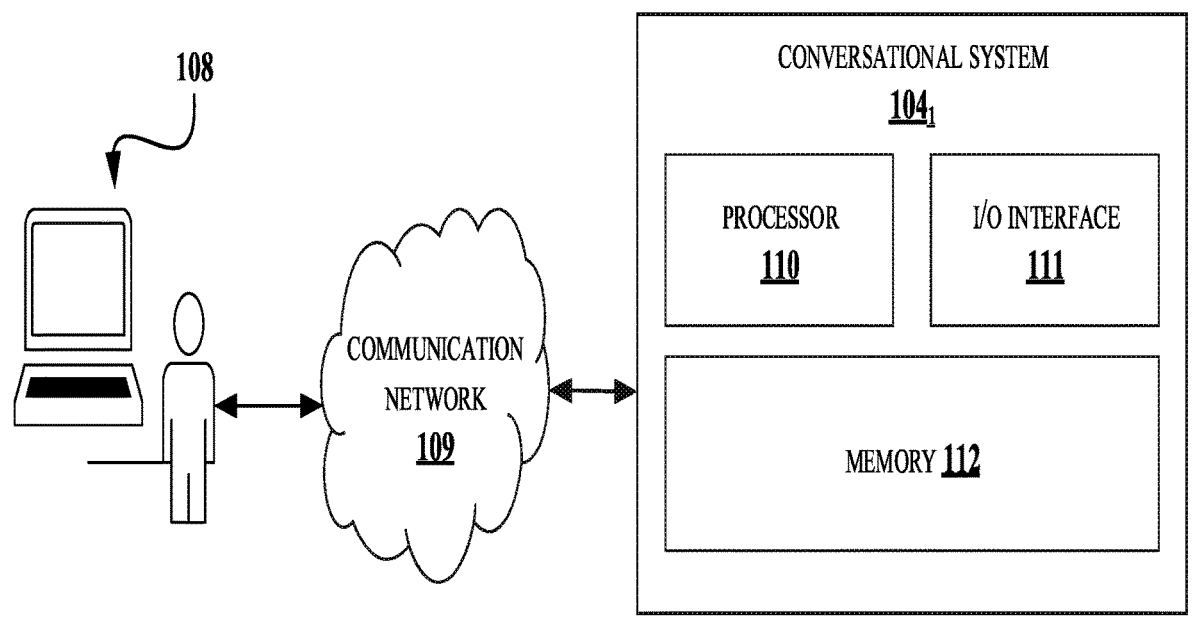
FIG. 1b shows an exemplary environment for providing natural language response to a user for a query using a conversational system, in accordance with some embodiments of the present disclosure.

Thereafter, the one or more classification models associated with the one or more conversational systems 104 may be utilized for providing natural language response to a user for a query as shown in FIG. 1b. As shown, the FIG. 1b may include a user device 108 connected via a communication network 109 with a conversational system $104_1$. FIG. 1b is an exemplary embodiment and the user device 108 may be connected with any of the one or more conversational systems 104. The user device 108 may include, but not limited to, a laptop computer, a desktop computer, a Personal Computer (PC), a notebook, a smartphone, a tablet, e-book readers, a server, a network server, a cloud-based server, and the like. In an embodiment, the user may interact with the conversational system $104_1$ via the communication network 109. In an embodiment, the communication network 109 may include, without limitation, a direct interconnection, Local Area Network (LAN), Wide Area Network (WAN), Controller Area Network (CAN), wireless network (e.g., using Wireless Application Protocol), the Internet, and the like. Further, the conversational system $104_1$ may include a processor 110, I/O interface 111, and a memory 112. In some embodiments, the memory 112 may be communicatively coupled to the processor 110. The memory 112 stores instructions, executable by the processor 110, which, on execution, may cause the conversational system $104_1$ to provide relevant natural language response to the user for a query by classifying the intent of the query, as disclosed in the present disclosure. In an embodiment, the conversational system $104_1$ may be a dedicated server implemented inside the user device 108. In another embodiment, the conversational system $104_1$ may be a cloud-based server. In an embodiment, the conversational system $104_1$ may be associated with multiple devices associated with the user. In such embodiment, the conversational system $104_1$ may communicate with each of the multiple devices to provide relevant natural language response to the user for the query associated with respective devices.

The conversational system $104_1$ may receive a query in a natural language from the user device 108. The query may be a text message, or a voice message. Upon receiving the query, the conversational system $104_1$ may classify an intent of the query using a classification model of the conversational system $104_1$. The classification model may be trained using the training data generated by the training data generation system 101. The query from the user device 108 may be classified into a tag, patterns, response, and context of the query. Upon classifying, the conversational system $104_1$ may map the query with the at least one of one or more SQL and NoSQL queries which were created during the generation of the training data. Upon mapping the query, the conversational system $104_1$ provides a natural language response to the user for the query.

Figure 2A:
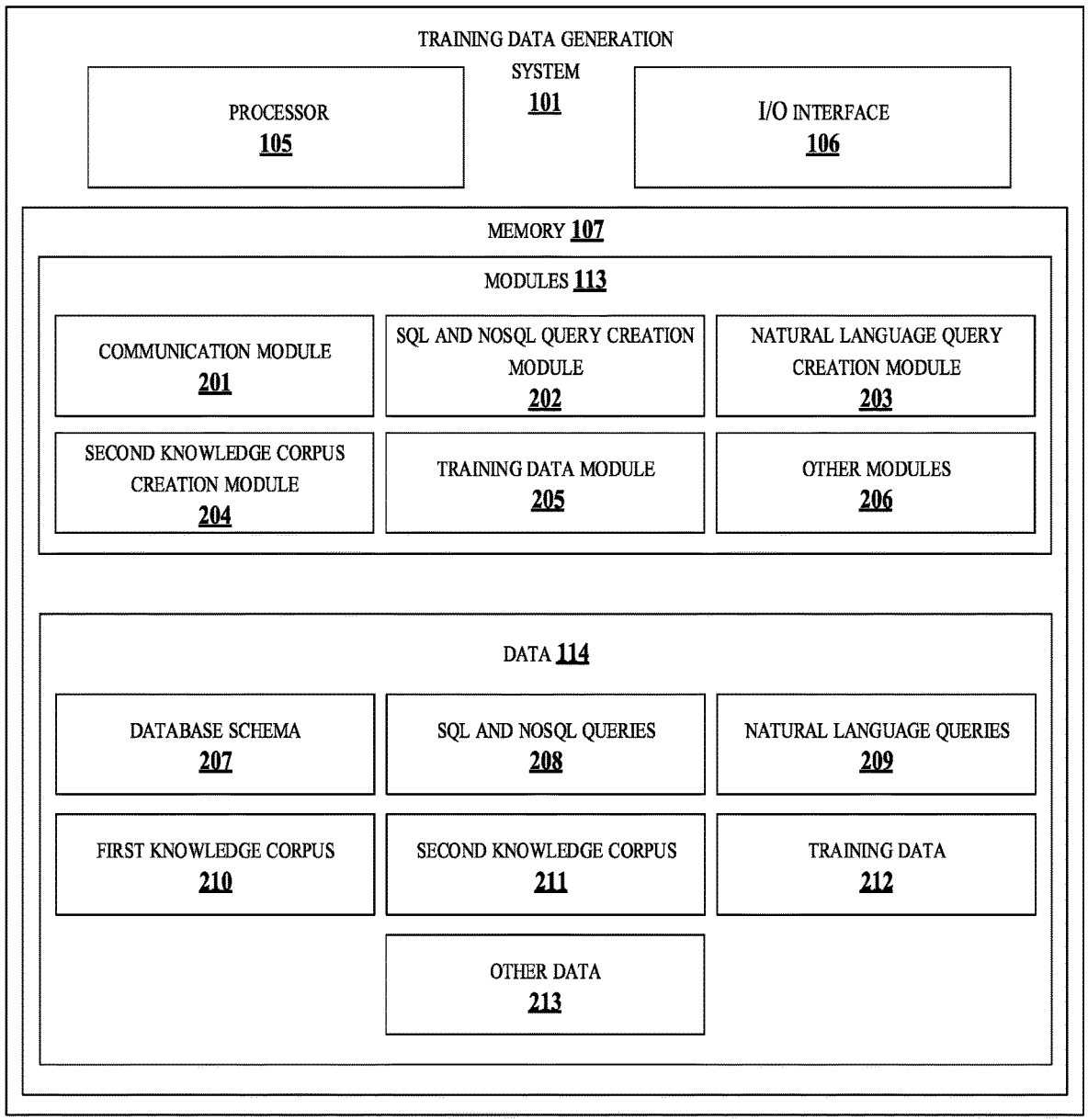
FIG. 2a shows a detailed block diagram of a training data generation system for generating training data for classifying intents in a conversational system, in accordance with some embodiments of the present disclosure.

FIG. 2a shows a detailed block diagram of a training data generation system for generating training data for classifying intents in a conversational system, in accordance with some embodiments of the present disclosure.

Data 114 and one or more modules 113 in the memory 107 of the training data generation system 101 is described herein in detail.

In one implementation, one or more modules 113 may include, but are not limited to, a communication module 201, a SQL and NoSQL query creation module 202, a natural language query creation module 203, a second knowledge corpus creation module 204, a training data module 205, and other modules 206, associated with the training data generation system 101.

In an embodiment, data 114 in the memory 107 may include database schema 207, SQL and NoSQL queries 208, natural language queries 209, first knowledge corpus 210, second knowledge corpus 211, training data 212, and other data 213 associated with the training data generation system 101.

In an embodiment, the data 114 in the memory 107 may be processed by the one or more modules 113 of the training data generation system 101. The one or more modules 113 may be configured to perform the steps of the present disclosure using the data 114, for generating the training data for classifying intents in the one or more conversational systems 104. In an embodiment, each of the one or more modules 113 may be a hardware unit which may be outside the memory 107 and coupled with the training data generation system 101. In an embodiment, the one or more modules 113 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

One or more modules 113 of the training data generation system 101 function to generate the training data for classifying intents in the one or more conversational system 104. The one or more modules 113 along with the data 114, may be implemented in any system, for generating the training data for classifying intents in the one or more conversational systems 104.

The database schema 207 may include details about the structured database which may comprise information related to an enterprise for which the training data is to be generated. For example, the database schema 207 may include tables containing data related to the enterprise. For instance, data about employees of the enterprise, a table containing details about products of the enterprise and so on.

The SQL and NoSQL queries 208 may include the one or more SQL and NoSQL queries created using the database schema 207.

The natural language queries 209 may include the one or more natural language queries which are generated from the SQL and NoSQL queries 208.

The first knowledge corpus 210 may be a lexical database of semantic relations between words of a specific natural language. The first knowledge corpus 210 is used to train the DNN model for the specific natural language.

The second knowledge corpus 211 may be a database which is a combination of the natural language queries 209 and a dictionary. The dictionary may be, but not limited to, WordNet.

The training data 212 may include information related to intent of the natural language queries 209 which may be used for training the one or more conversational system 104 for classifying intents of a query. The information related to the intents may include tags, patterns, responses, and context associated with natural language queries 209.

The other data 213 may store data, including temporary data and temporary files, generated by modules for performing the various functions of the training data generation system 101.

The communication module 201 may receive a database schema as input from the device 102 associated with the enterprise. The database schema may include information related to the enterprise for which training data is to be generated. Table 1 below shows an example of a table of the database schema 207 received by the communication module 201 as one of the inputs for which training data is to be generated.

TABLE 1

| Employee_ID | Name | Salary | Date_Of_Joining | Department | Is_Manager |
|---|---|---|---|---|---|
| 001 | Peter | 100,000 | 2020 Dec. 11 | Analytics | Yes |
| 002 | Mark | 50,000 | 2007 Nov. 1 | Engineering | No |
| 003 | Bill | 90,000 | 2004 Jul. 15 | Engineering | Yes |
| 004 | Steve | 55,000 | 2020 Mar. 6 | Analytics | No |
| 005 | Jack | 80,000 | 2012 Dec. 1 | Engineering | No |
| 006 | Ginny | 57,000 | 2018 Jan. 5 | Analytics | No |

Figure 3A:
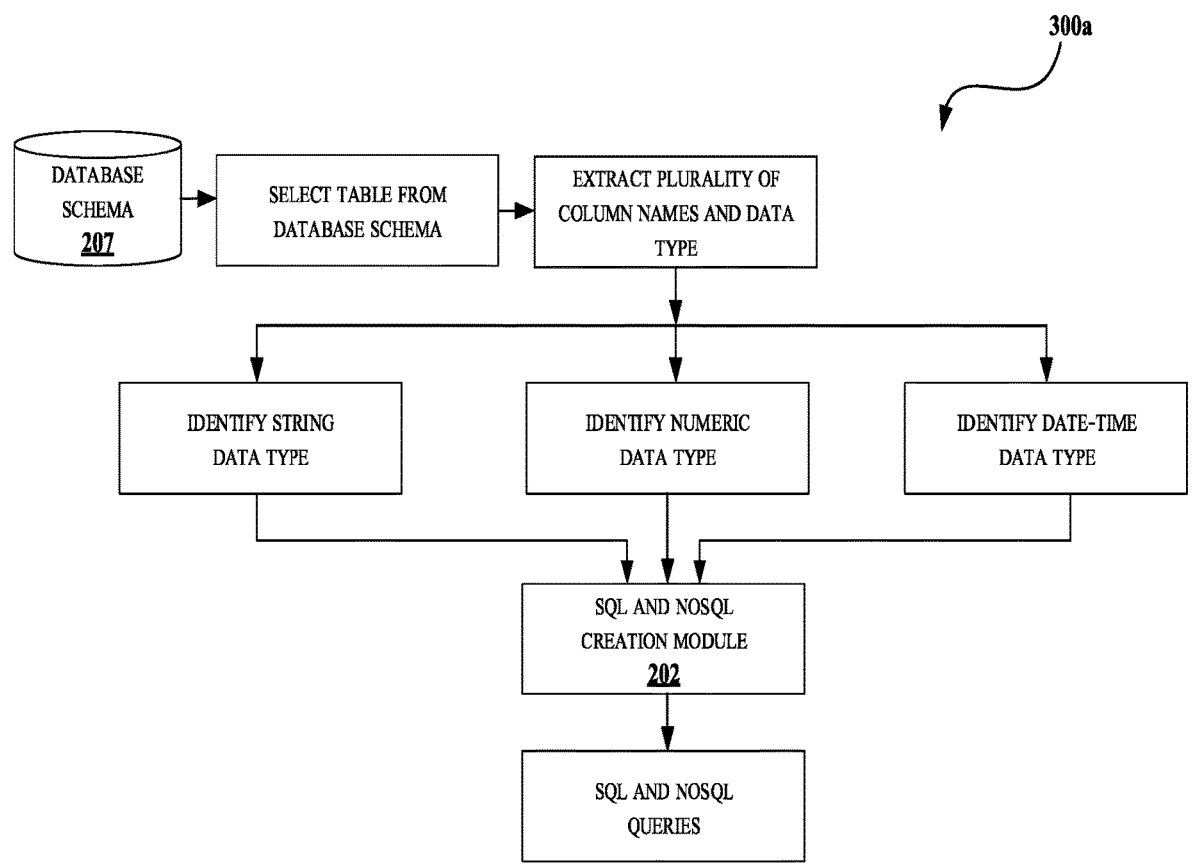
FIGS. 3a and 3b shows exemplary embodiments for generating SQL and NoSQL queries for a structured database, in accordance with some embodiments of present disclosure.
Figure 3B:
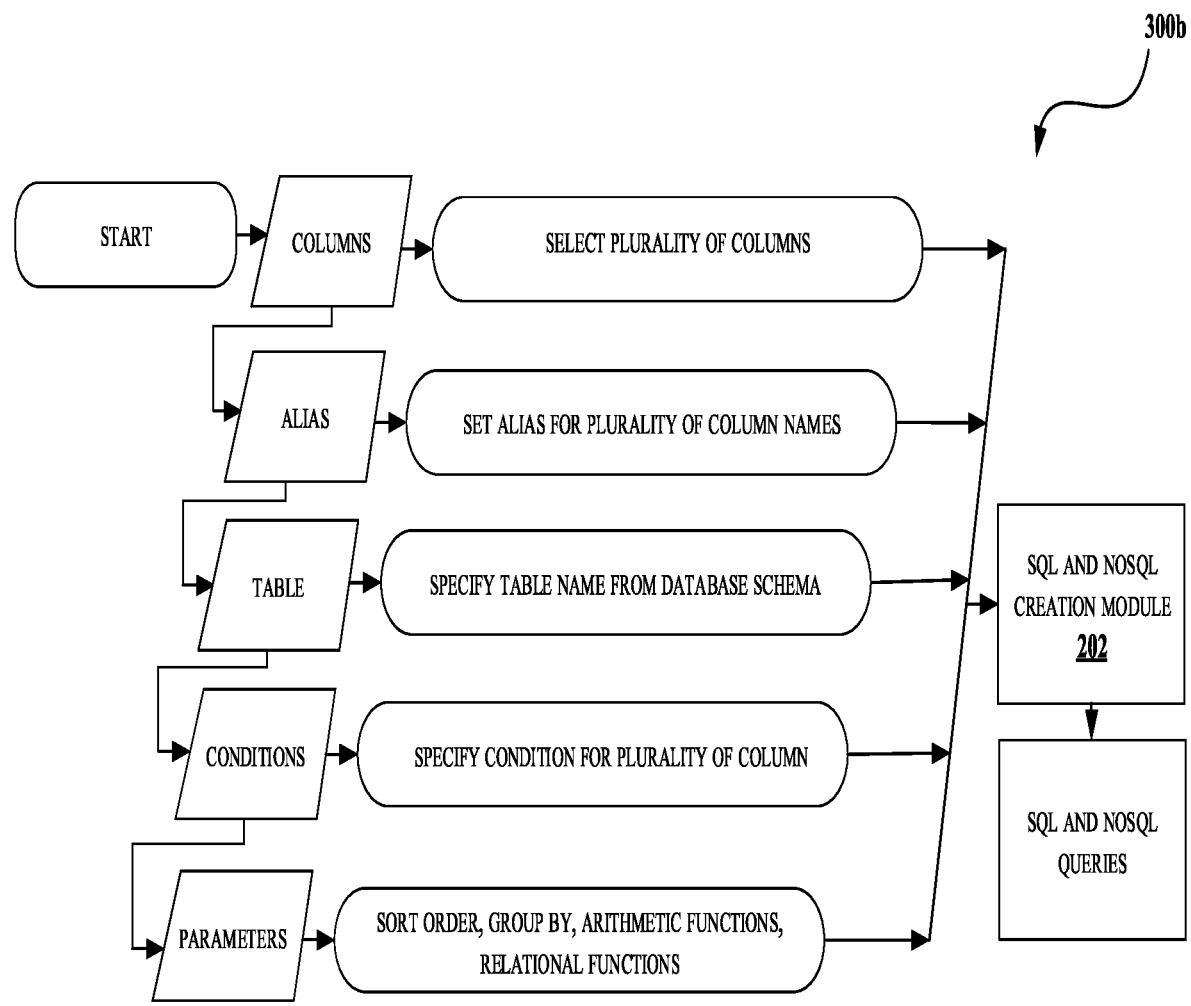

As shown above, the Table 1 is an employee_detail table which include information related to employee_id given to employees of an abc company, names of the employees, salary of the employees, date_of_joining of the employees in the abc company, department of each employee, and information related to position of the employees. Upon receiving the database schema 207, the SQL and NoSQL query creation module 202 may create at least one of one or more SQL and NoSQL queries based on the database schema 207 using the predefined rules. The predefined rules may be a set of instructions or steps which are to be followed for creating the at least one of the one or more SQL and NoSQL queries. FIGS. 3a and 3b shows exemplary embodiment for generating the at least one or more SQL and NoSQL queries for the database schema 207. In an embodiment, the SQL and NoSQL query creation module 202 may select table from the database schema 207. For example, the employee_detail table is selected by the SQL and NoSQL query creation module 202. Upon selecting, the SQL and NoSQL query creation module 202 may extract plurality of column names and data type of the column names. For example, the plurality of column names for the employee_detail table may be employee_id, name, salary, date_of_joining, department, and is_manger. The data type of the column names may be string data type, numeric data type and date-time data type. In this case, the string data type may be name column, department column and is_manger column. The numeric data type may be employee_id column, and salary column. The date-time data type may be date_of_joining column. Upon identifying the data types of each of the plurality of column names, the SQl and NoSQl query creation module 202 may specify condition for each of the plurality of column. For example, the conditions may be WHERE condition, AND condition, OR condition for the string data type column. Similarly, the conditions may be MIN, MAX, COUNT, AVG and the like for the numeric data type column. Similarly, the conditions may be SELECT, BETWEEN, and the like for the date-time data type column. Upon specifying the conditions, the SQL and NoSQL query creation module 202 may include parameters such as sort order, group by, arithmetic function parameters, relational function parameters and so on. Further, upon including the parameter, the SQL and NoSQL query creation module 202 may create the at least one or more SQL and NoSQL queries for the selected table. For instance, one of SQL query for the employee_detail table may be "SELECT SUM (salary) FROM employee_detail WHERE Department="Analytics" AND Date_Of_Joining>2018-01-01". Returning to FIG. 2a, in an embodiment, the at least one or more SQL and NoSQL queries which are created may be stored in the memory 107 as the SQL and NoSQL queries 208.

Figure 4:
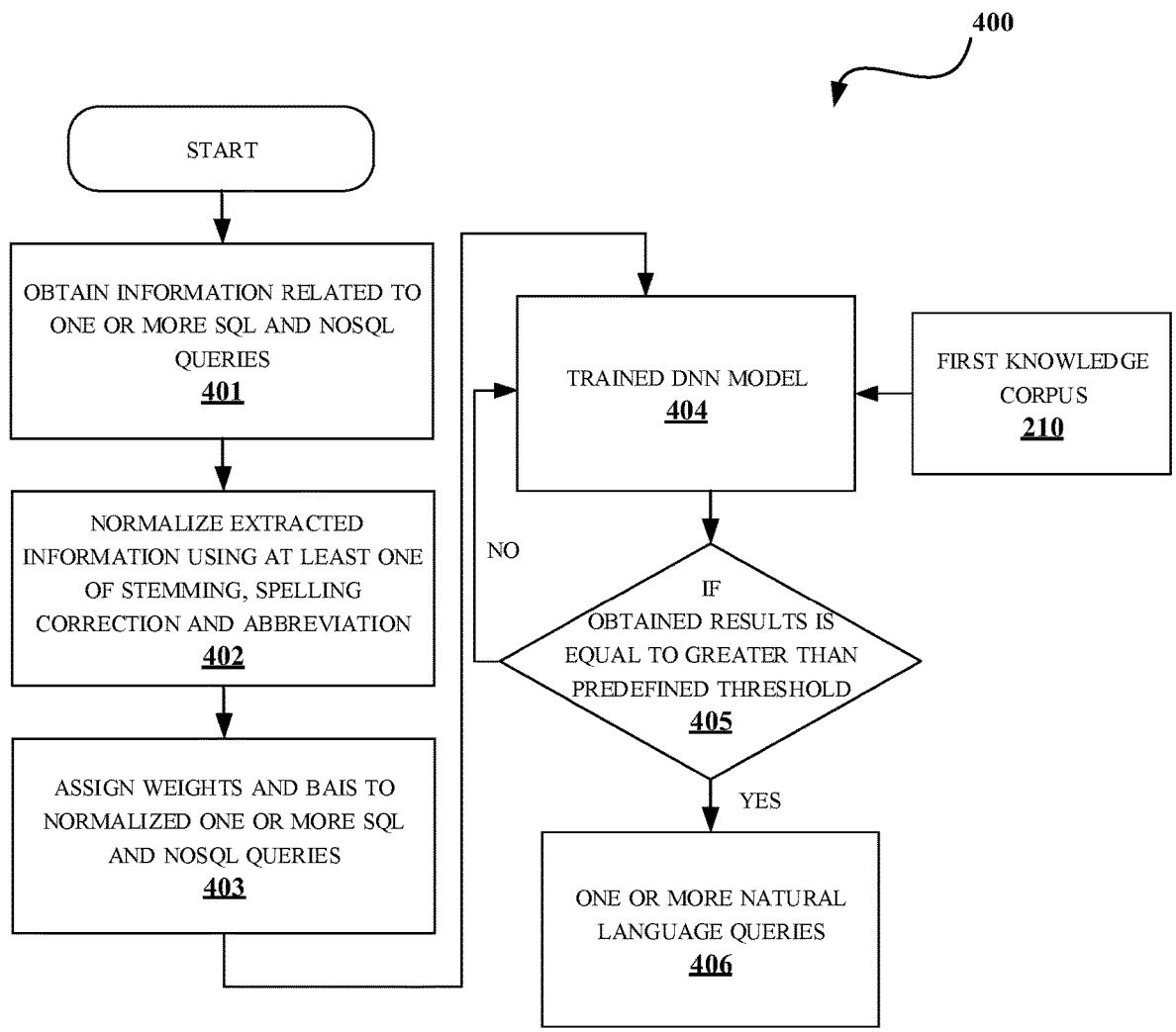
FIG. 4 illustrates a flowchart showing exemplary method for generating natural language queries for a structured database, in accordance with some embodiments of present disclosure.

Further, upon creating the SQL and NoSQL queries 208, the natural language query creation module 203 may convert the SQL and NoSQL queries 208 into their respective one or more natural language queries. FIG. 4 show exemplary embodiment for converting the SQL and NoSQL queries 208 into the one or more natural language queries. In an embodiment, the natural language query creation module 203 may obtain information related to the SQL and NoSQL queries 208. The information may include details about the types of operations used in the SQL and NoSQL queries 208, column names of each table used in the SQL and NoSQL queries 208 and the data type of each column name. For example, for the SQL query "SELECT SUM (salary) FROM employee_detail WHERE Department="Analytics" AND Date_Of_Joining>2018-01-01" may extract information related to the SQL query. Upon extracting, the natural language query creation module 203 may normalize the extracted information by performing for example, stemming, spelling correction and abbreviation expansion. Further, upon normalizing, the natural language query creation module 203 may assign weights and bias to the normalized SQL query and provide to a trained DNN model. In an embodiment, the DNN model is trained using the first knowledge corpus 210 for generating the respective one or more natural language queries. Upon generating the one or more natural language queries, the DNN model may check if the generated one or more natural language queries are equal to or greater than a predefined threshold. The one or more natural language queries which are not equal to or greater than the predefined threshold may be provided back to the DNN model for re-training. The one or more natural language queries which are equal to the predefined threshold are stored in the memory 107 as the natural language queries 209. For example, the natural language query for the above created SQL query may be "what is the total salary given out to people in analytics department hired after 2018?". Returning to FIG. 2a, in an embodiment, upon generating the natural language query, the second knowledge corpus creation module 204 may create the second knowledge corpus 211 based on the natural language query and the first knowledge corpus 210 using the semantic analysis methodology. In an embodiment, the semantic analysis methodology includes topic classification to understand semantic relations between the natural language query with the first knowledge corpus 210. Thus, the second knowledge corpus 211 includes information related to the natural language query.

Figure 5:
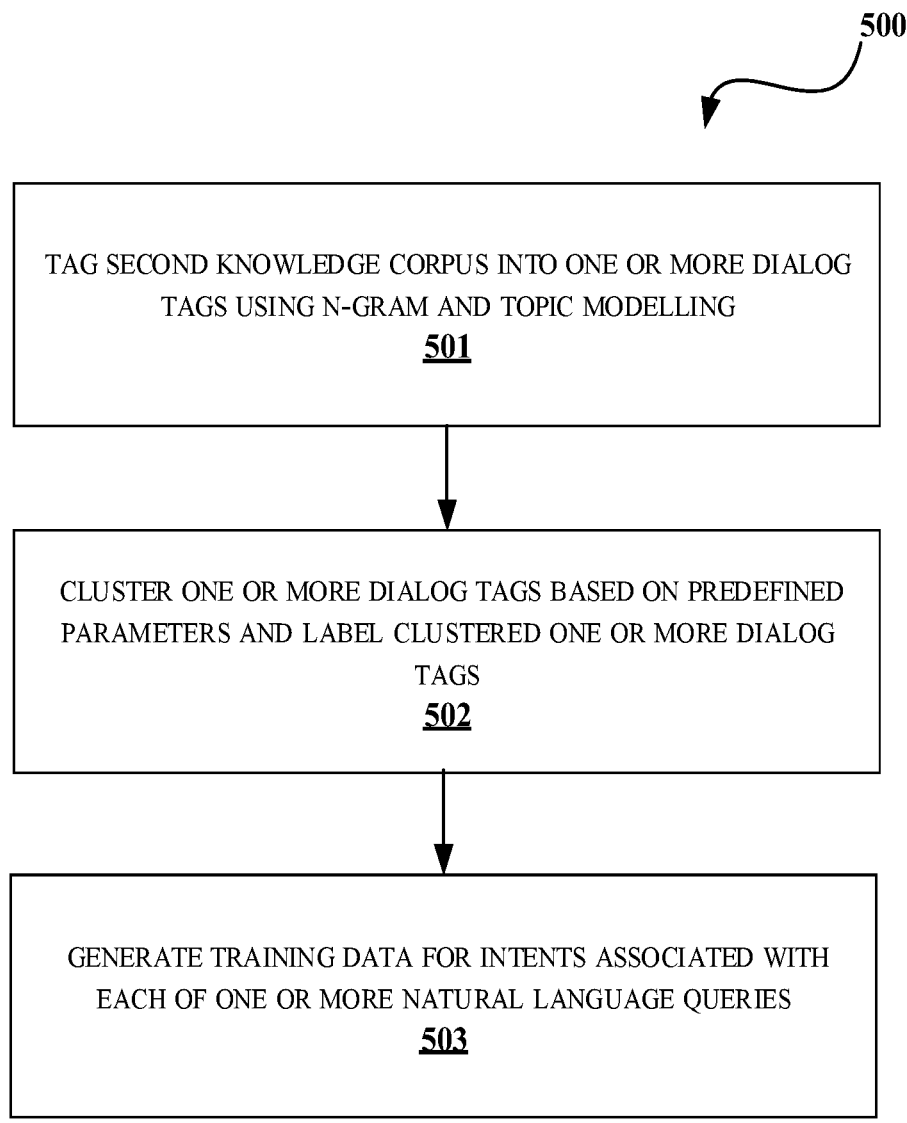
FIG. 5 illustrates a flowchart showing exemplary method for classifying intents in a conversational system, in accordance with some embodiments of present disclosure.

Upon creating the second knowledge corpus 211, the training data module 205 may generate the training data for intents associated with each of the natural language query using the second knowledge corpus 211. In an embodiment, the training data module 205 utilises the second knowledge corpus 211 for generating the intents using the intent mining methodology. In an embodiment, the training data module 205 comprises a dialog act classifier which provides a general representation of intent of the user which is not bound to any dialog domain. Thus, the generated intent is the training data for classification of intent in real-time. FIG. 5 illustrates a flowchart showing exemplary method for classifying intents in a conversational system, in accordance with some embodiments of present disclosure. The method for classifying intents is performed by the training data module 205. As shown, the information related to the second knowledge corpus 211 may be tagged into one or more dialog tags using the N-gram and the topic modelling. Upon tagging, the training data module 205 may cluster the one or more dialog tags based on the predefined parameters and labels the clustered one or more dialog tags. Further, the training data module 205 may generate the training data intents associated with the natural language query based on the clustered and labelled one or more dialog tags. The intent may comprise tags, patterns, response, and context associated with the natural langue query. For example, for the natural language query "what is the total salary given out to people in analytics department hired after 2018?" the training data for intent generated may be tag "total_salary", patterns "total salary in analytics department joined after 2018?", "total compensation given out to people in analytics hired after 2018?", "how much salary was given in total to people in analytics who were hired after 2018?" and like, responses "total_salary of <SUM> was given to people in analytics department who were hired after 2018", "sum of <SUM> was given to analytics people with date of joining after 2018" and like, and context "total_salary". In an embodiment, the training data for intents may be stored in the database 103 and provided to the one or more conversational systems 104 for providing relevant natural language response for a user's query.

Returning to FIG. 2a, the one or more modules 115 may also include other modules 206 to perform various miscellaneous functionalities of the training data generation system 101. It will be appreciated that such modules may be represented as a single module or a combination of different modules.

Figure 2B:
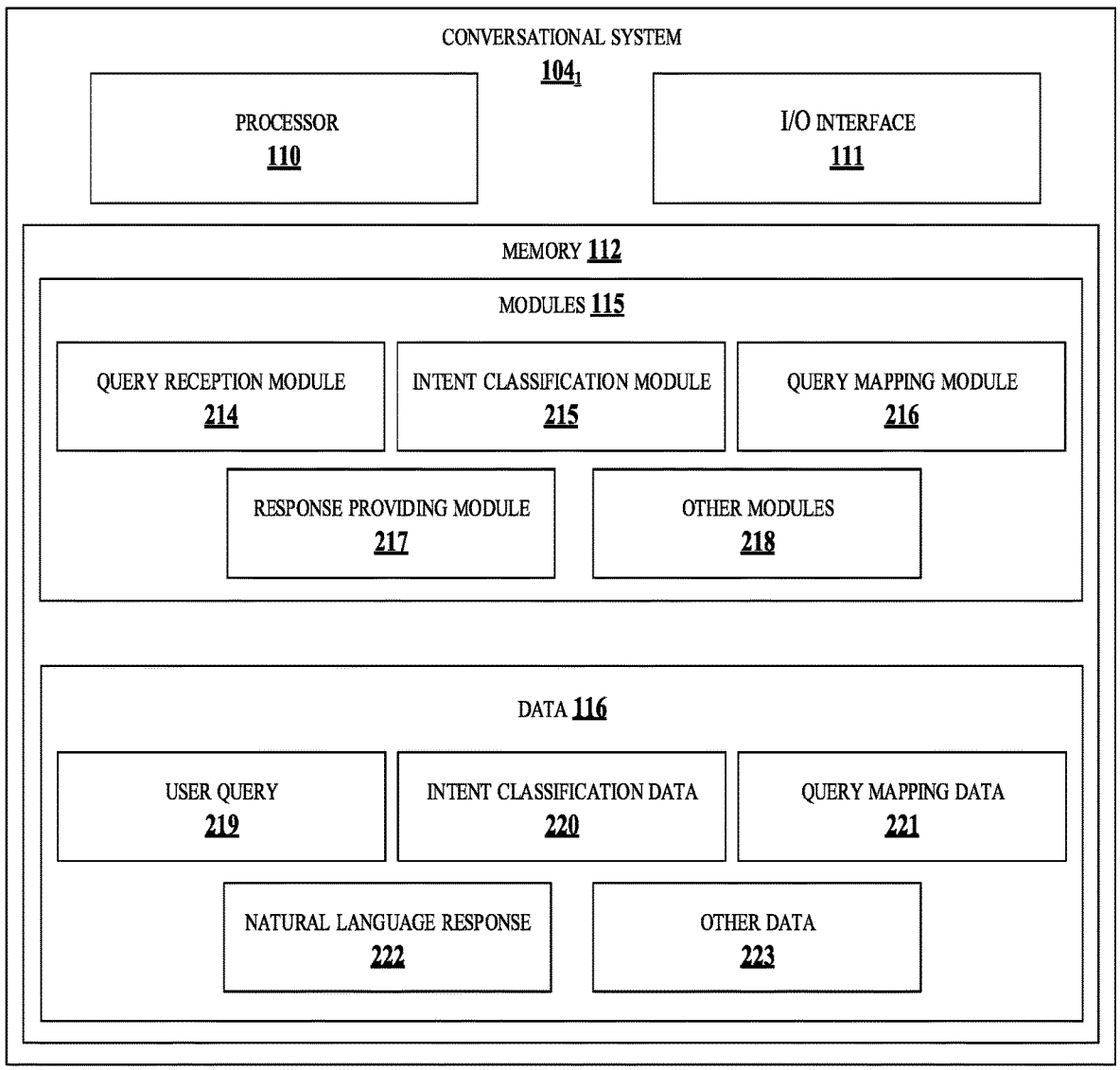
FIG. 2b shows a detailed block diagram of a conversational system for providing natural language response to a user for a query, in accordance with some embodiments of the present disclosure.

FIG. 2b shows a detailed block diagram of a conversational system for providing natural language response to a user for a query, in accordance with some embodiments of the present disclosure.

Data 116 and one or more modules 115 in the memory 112 of the conversational system $104_1$ is described herein in detail.

In one implementation, one or more modules 115 may include, but are not limited to, a query reception module 214, an intent classification module 215, a query mapping module 216, a response providing module 217, and one or more other modules 218, associated with the conversational system $104_1$.

In an embodiment, data 116 in the memory 112 may include user query 219, intent classification data 220, query mapping data 221, natural language response 222, and other data 223 associated with the conversational system $104_1$.

In an embodiment, the data 116 in the memory 112 may be processed by the one or more modules 115 of the conversational system $104_1$. The one or more modules 115 may be configured to perform the steps of the present disclosure using the data 116, for providing natural language response to a user for a query. In an embodiment, each of the one or more modules 115 may be a hardware unit which may be outside the memory 112 and coupled with the conversational system $104_1$. In an embodiment, the one or more modules 115 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PsoC), a combinational logic circuit, and/or other suitable components that provide the described functionality.

One or more modules 115 of the conversational system $104_1$ function to provide natural language response to the user for a query. The one or more modules 115 along with the data 114, may be implemented in any system, for providing natural language response to the user for a query.

The user query 219 may include details about a query entered by the user.

The intent classification data 220 may include details about the intent of the user query 219. The intent may comprise tags, patterns, responses, and context.

The query mapping data 221 may include details about the SQL and NoSQL queries 208 which may map with the user query 219.

The natural language response 222 may include the results provided by the conversational system $104_1$ for the user query 219.

The other data 223 may store data, including temporary data and temporary files, generated by modules for performing the various functions of the conversational system $104_1$.

In an embodiment, the query reception module 214 may receive a query in natural langue from a user. The query may be a text message, or a voice message provided by the user. For example, consider the query may be "give maximum salary for analytics department". Upon receiving the query, the intent classification module 215 may classify the intent for the query by using classification model associated with the conversational system $104_1$. In an embodiment, the classification model is trained by using the training data generated by the training data generation system 101. For example, for the query "give maximum salary for analytics department" the classified intent may be tag "max_salary_analytics", patterns "maximum salary in analytics", response "Maximum salary in analytics is: <SUM>", context "max_salary". Upon classifying, the query mapping module 216 may map the query to the SQL and NoSQL queries 208 based on the classified intent. Upon mapping, the response providing module 217 may provide response for the query entered by the user from a database based on the mapped query.

The one or more modules 113 may also include other modules 218 to perform various miscellaneous functionalities of the conversational system $104_1$. It will be appreciated that such modules may be represented as a single module or a combination of different modules.

Figure 6:
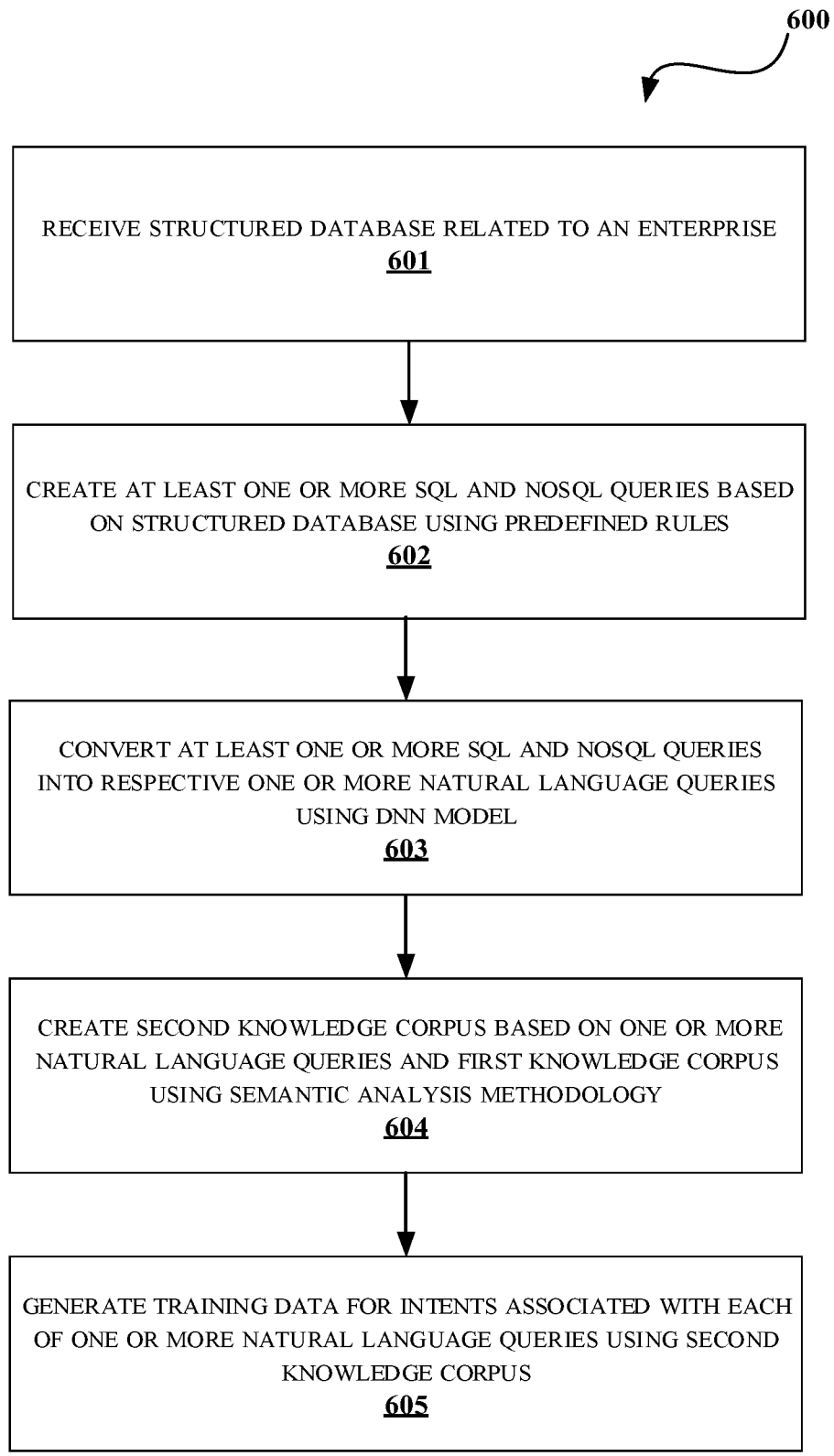
FIG. 6 illustrates a flowchart showing exemplary method for generating training data for classifying intents in a conversational system, in accordance with some embodiments of present disclosure.

FIG. 6 illustrates a flowchart showing exemplary method for generating training data for classifying intents in a conversational system, in accordance with some embodiments of present disclosure.

As illustrated in FIG. 6, the method 600 may include one or more blocks for executing processes in the training data generation system 101. The method 600 may be described in the general context of computer executable instructions. Generally, computer executable instructions can include routines, programs, objects, components, data structures, procedures, modules, and functions, which perform particular functions or implement particular abstract data types.

The order in which the method 600 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 601, receiving, by the communication module 201, the database schema 207 related to an enterprise from the device 102. The database schema 207 for instance may include information related to employees of the enterprise.

At block 602, upon receiving the database schema 207, creating, by the SQL and NoSQL query creation module 202, at least one of the one or more SQL and NoSQL queries based on the database schema 207 using the predefined rules.

At least one of the one or more SQL and NoSQL queries may be created by extracting details of the plurality of columns from each table of the database schema 207. Upon extracting, the SQL and NoSQL query creation module 202 may identify data type corresponding to each of the plurality of columns and create at least one of, the one or more SQL and NoSQL queries for each of the plurality of columns using the predefined rules associated with respective data type.

At block 603, upon creating the at least one or more SQL and NoSQL queries, converting, by the natural language query creation module 203, the at least one or more SQL and NoSQL queries into respective natural language queries using the DNN model. The DNN model may be trained using the first knowledge corpus 210 of a specific natural language.

In an embodiment, the information related to the at least one of the one or more SQL and NoSQL queries may be obtained. The information comprises types of operations used in the at least one of the one or more SQL and NoSQL queries, column names of each table used in at least one of the one or more SQL and NoSQL queries, and the data type of each column name. Further, upon obtaining the information, the information is normalised by using techniques such as, stemming, spelling correction and abbreviation expansion. The one or more natural language queries are generated by assigning weights and bias to the normalized SQL and No SQL queries by using the DNN model and the first knowledge corpus 210.

At block 604, upon converting the at least one or more SQL and NoSQL queries, creating, by the second knowledge corpus creation module 204, the second knowledge corpus 211 based on the one or more natural language queries and the first knowledge corpus 210 using the semantic analysis methodology.

In an embodiment, the second knowledge corpus 211 is tagged into one or more dialog tags using the N-gram and the topic modelling. In an embodiment, the tagged second knowledge corpus 211 provides a general representation of intent of the user which is not bound to any dialog domain.

At block 605, upon creating the second knowledge corpus 211, generating, by the training data module 205, training data for intents associated with the one or more natural language queries. Particularly, the training data module 205 may cluster the one or more dialog tags based on the predefined parameters and label the clustered one or more dialog tags. Further, the training data may be provided to the classification model of the one or more conversational systems 104 for classifying intents.

Figure 7:
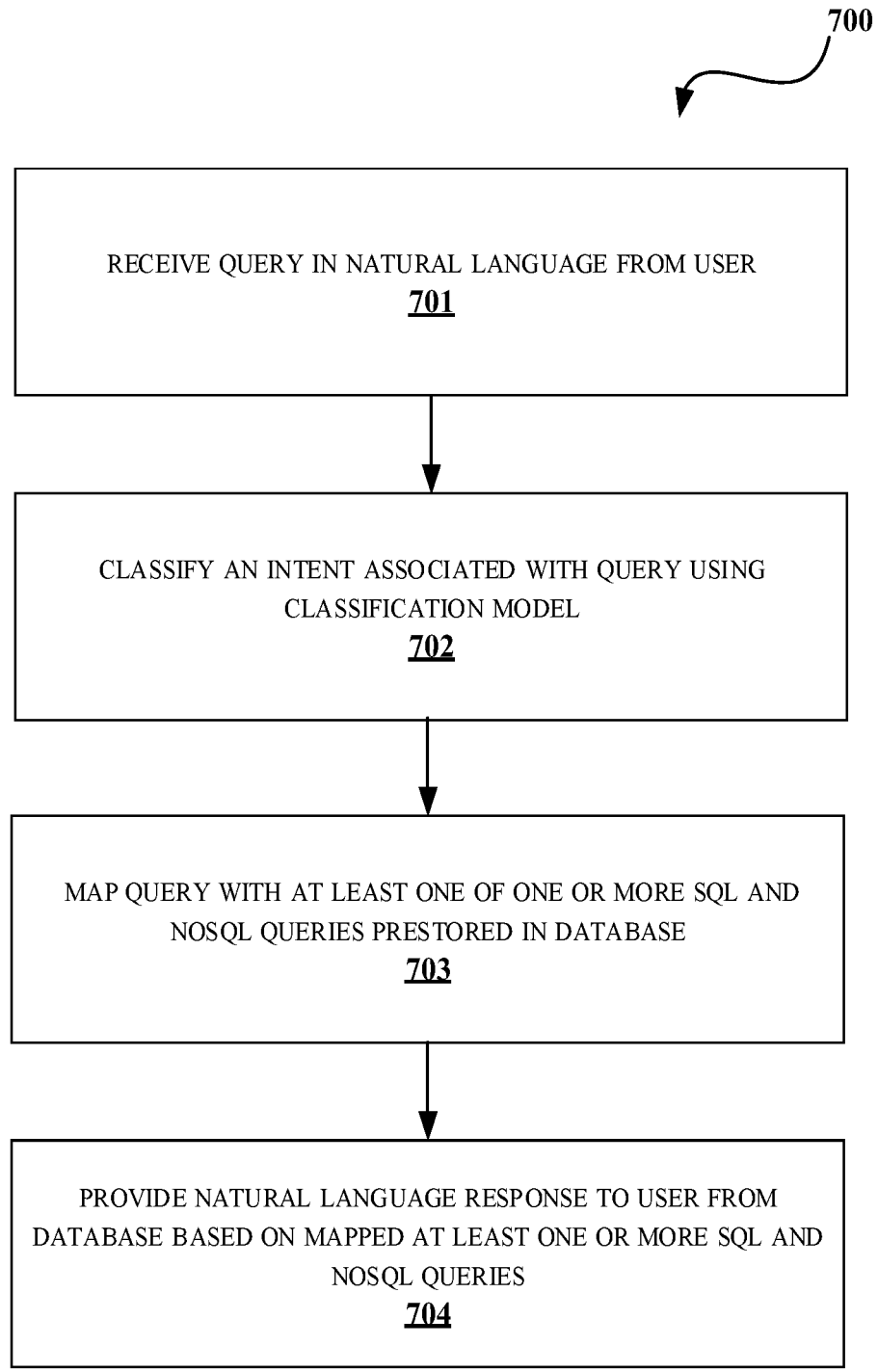
FIG. 7 illustrates a flowchart showing exemplary method for providing natural language response to a user for a query using the conversational system, in accordance with some embodiments of present disclosure.

FIG. 7 illustrates a flowchart showing exemplary method for providing natural language response to a user for a query using the conversational system, in accordance with some embodiments of present disclosure.

As illustrated in FIG. 7, the method 700 may include one or more blocks for executing processes in the conversational system $104_1$. The method 700 may be described in the general context of computer executable instructions. Generally, computer executable instructions can include routines, programs, objects, components, data structures, procedures, modules, and functions, which perform particular functions or implement particular abstract data types.

The order in which the method 700 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 701, receiving, by the query reception module 214, the query from the user device 108. The query may be a text message, or voice message.

At block 702, classifying, by the intent classification module 215, the query into intent using the classification model of the conversational system $104_1$. The classification model is trained using the training data generated by the training data generation system 101.

At block 703, mapping, by the query mapping module 216, the query with the at least one or more SQL and NoSQL queries created by the training data generation system 101 using the classified intent.

At block 704, providing, by the response providing module 217, a response for the user query 219 in natural language from the database based on the mapped user query.

Computing System

Figure 8:
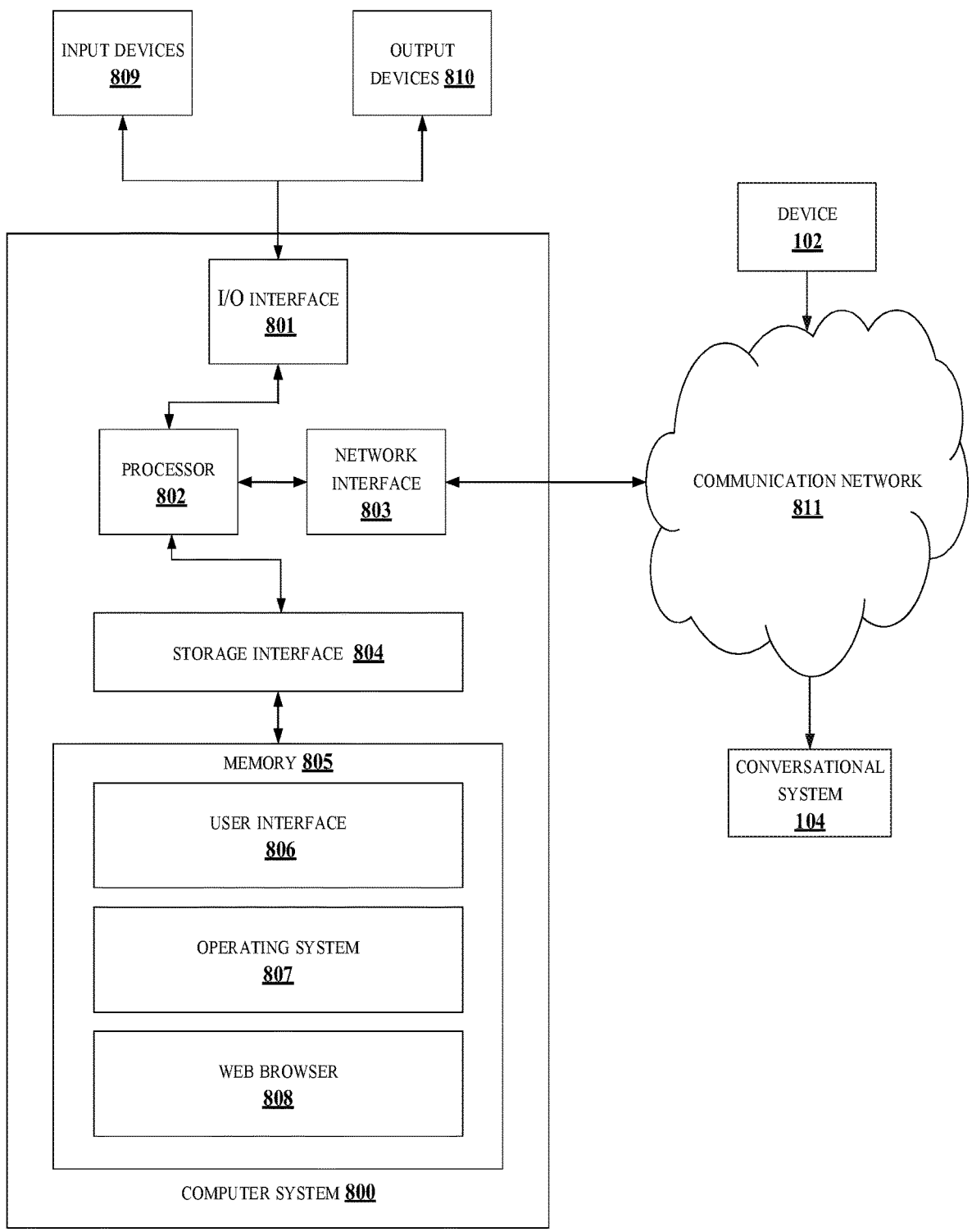
FIG. 8 illustrates a block diagram of an exemplary computer system for implementing embodiments consistent with the present disclosure.

FIG. 8 illustrates a block diagram of an exemplary computer system 800 for implementing embodiments consistent with the present disclosure. In an embodiment, the computer system 800 is used to implement the training data generation system 101. The computer system 800 may include a central processing unit ("CPU" or "processor") 802. In an embodiment, the processor 802 bears the processor 105. The processor 802 may include at least one data processor for executing processes in Virtual Storage Area Network. The processor 802 may include specialized processing units such as, integrated system (bus) controllers, memory management control units, floating point units, graphics processing units, digital signal processing units, etc.

The processor 802 may be disposed in communication with one or more input/output (I/O) devices 809 and 810 via I/O interface 801. The I/O interface 801 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 801, the computer system 800 may communicate with one or more I/O devices 809 and 810. For example, the input devices 809 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 810 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 800 may consist of the training data generation system 101. The processor 802 may be disposed in communication with the communication network 811 via a network interface 803. The network interface 803 may communicate with the communication network 811. The network interface 803 may employ connection protocols including, without limitation, direct connect, Ethernet (e.g., twisted pair 10/100/ 1000 Base T), transmission control protocol/internet protocol (TCP/IP), token ring, IEEE 802.11a/b/g/n/x, etc. The communication network 811 may include, without limitation, a direct interconnection, local area network (LAN), wide area network (WAN), wireless network (e.g., using Wireless Application Protocol), the Internet, etc. Using the network interface 803 and the communication network 811, the computer system 800 may communicate with the device 102 for generating the training data for classifying intents in the conversational system 104. The conversational system 104 may include the processor 110, and the memory 112 (not shown explicitly in FIG. 8, covered in FIG. 1b). The memory 112 may be communicatively coupled to the processor 110. The memory 112 stores instructions, executable by the processor 110, which, on execution, may cause the conversational system 104 to provide relevant natural language response to the user for a query by classifying the intent of the query. The network interface 803 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 811 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 802 may be disposed in communication with a memory 805 (e.g., RAM, ROM, etc. not shown in FIG. 8) via a storage interface 804. In an embodiment, the memory 805 bears the memory 107. The storage interface 804 may connect to memory 805 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 805 may store a collection of program or database components, including, without limitation, user interface 806, an operating system 807 etc. In some embodiments, computer system 800 may store user/application data 806, such as, the data, variables, records, etc., as described in this disclosure. Such databases may be implemented as fault-tolerant, relational, scalable, secure databases such as Oracle® or Sybase®.

The operating system 807 may facilitate resource management and operation of the computer system 800. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™ VISTA™/7/8, 10 etc.), APPLE® IOS™, GOOGLE® ANDROID™, BLACKBERRY® OS, or the like.

In some embodiments, the computer system 800 may implement a web browser 808 stored program component. The web browser 808 may be a hypertext viewing application, such as Microsoft Internet Explorer, Google Chrome, Mozilla Firefox, Apple Safari, etc. Secure web browsing may be provided using Hypertext Transport Protocol Secure (HTTPS), Secure Sockets Layer (SSL), Transport Layer Security (TLS), etc. Web browser 808 may utilize facilities such as AJAX, DHTML, Adobe Flash, JavaScript, Java, Application Programming Interfaces (APIs), etc. In some embodiments, the computer system 800 may implement a mail server stored program component. The mail server may be an Internet mail server such as Microsoft Exchange, or the like. The mail server may utilize facilities such as ASP, ActiveX, ANSI C++/C #, Microsoft .NET, Common Gateway Interface (CGI) scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 800 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

Advantages

An embodiment of the present disclosure provisions a method for automatically generating training data for classifying intents in the conversational system which may be a multi-domain system. This allows to provide a unified system that can be integrated/plug-n-play to any existing platform without the need to manually generate intents (patterns, responses, and contexts) by the developer.

An embodiment of the present disclosure provisions a method for developing the conversational system without manually entering the training data. Thus, the conversational system provides better responses to the user for the entered query.

An embodiment of the present disclosure improves performance of the conversational system by classifying the intent of the query using the training data and provides relevant results for the query.

An embodiment of the present disclosure provisions to learn domain specific natural language by automatically generating training data.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 6 and 7 shows certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral numerals: | |
|---|---|
| Reference Number | Description |
| 100 | Environment |
| 101 | Training data generation system |
| 102 | Device |
| 103 | Database |
| 104 | One or more conversational system |
| 105 | Processor |
| 106 | I/O interface |
| 107 | Memory |
| 108 | User device |
| 109 | Communication network |
| 110 | Processor |
| 111 | I/O interface |
| 112 | Memory |
| 113 | Modules |
| 114 | Data |
| 201 | Communication module |
| 202 | SQL and NoSQL query creation module |
| 203 | Natural language query creation module |
| 204 | Second knowledge corpus creation module |
| 205 | Training data module |
| 206 | Other modules |
| 207 | Database schema |
| 208 | SQL and No SQL queries |
| 209 | Natural language queries |
| 210 | First knowledge corpus |
| 211 | Second knowledge corpus |
| 212 | Training data |
| 213 | Other data |
| 115 | Modules |
| 116 | Data |
| 214 | Query reception module |
| 215 | Intent classification module |
| 216 | Query mapping module |
| 217 | Response providing module |
| 218 | Other modules |
| 219 | User query |
| 220 | Intent classification data |
| 221 | Query mapping data |
| 222 | Natural language response |
| 223 | Other data |
| 800 | Computer system |
| 801 | I/O Interface |
| 802 | Processor |
| 803 | Network interface |
| 9804 | Storage interface |
| 805 | Memory |
| 806 | User interface |

| Reference Number | Description |
| --- | --- |
| 807 | Operating system |
| 808 | Web browser |
| 809 | Input devices |
| 810 | Output devices |
| 811 | Communication network |

We claim:

1. A method for providing natural language response to a user for a query using a conversational system (104₁), the method comprising:

receiving, by a conversational system (104₁), a query in a natural language from a user;

classifying, by the conversational system (104₁), an intent associated with the query by using a classification model associated with the conversational system (104₁), wherein the classification model is trained by using a method for generating training data for classifying intents in a conversational system (104₁), the generating method comprising:

receiving, by a training data generation system (101), structured databases schema, wherein the structured databases schema comprise information related to an enterprise;

creating, by the generation system (101), at least one of one or more Structured Query Language (SQL) and not only SQL (NoSQL) queries based on the structured databases schema by using predefined rules;

converting, by the generation system (101), at least one of the one or more SQL and NoSQL queries into respective one or more natural language queries using a Deep Learning Neural Network (DNN) model, wherein the DNN model is trained using a first knowledge corpus (210) of a specific natural language;

creating, by the generation system (101), a second knowledge corpus based on the one or more natural language queries and the first knowledge corpus (210) using semantic analysis methodology; and generating, by the generation system (101), training data for intents associated with each of the one or more natural language queries using the second knowledge corpus, wherein the training data is provided to one or more classification models for classifying an intent in the conversational system (104₁);

mapping, by the conversational system (104₁), the query with at least one of, one or more SQL and NoSQL queries prestored in a database using the classified intent; and providing, by the conversational system (104₁), a natural language response to the user from the database based on the mapped at least one of the one or more SQL and NoSQL queries.

2. The method as claimed in claim 1, wherein the creation of at least one of the one or more SQL and NoSQL queries based on the structured databases schema, comprises:

extracting, by the generation system (101), details of a plurality of columns from each table of the structured databases schema and identifying data type corresponding to each of the plurality of columns; and creating, by the generation system (101), at least one of the one or more SQL and NoSQL queries for each of the plurality of columns using the predefined rules associated with respective data type.

3. The method as claimed in claim 1, wherein converting at least one of the one or more SQL and NoSQL queries into the respective one or more natural language queries, comprises:

obtaining, by the generation system (101), information related to at least one of the one or more SQL and NoSQL queries, wherein the information comprises types of operations used in at least one of the one or more SQL and NoSQL queries, column names of each table used in at least one of the one or more SQL and NoSQL queries, and data type of each column name;

normalising, by the generation system (101), the extracted information using at least one of stemming, spelling correction and abbreviation expansion; and generating, by the generation system (101), the one or more natural language queries by assigning weights and bias to the normalized at least one of the one or more SQL and No SQL queries using the DNN model and the first knowledge corpus (210).

4. The method as claimed in claim 1, wherein generating the training data for the intents associated with each of the one or more natural language queries, comprises:

tagging, by the generation system (101), the second knowledge corpus into one or more dialog tags using N-gram and topic modelling;

clustering, by the generation system (101), the one or more dialog tags based on predefined parameters and labelling the clustered one or more dialog tags; and generating, by the generation system (101), the training data for the intents associated with each of the one or more natural language queries based on the clustered and the labelled one or more dialog tags, wherein the intents comprise tags, patterns, responses, and context associated with the one or more natural language queries.

5. The method as claimed in claim 1, wherein the query includes one of a text message, and a voice message.

6. A conversational system (104₁) for providing natural language response to a user for a query, comprising:

a training data generation system (101) for generating training data for classifying intents in a conversational system (104₁), comprising:

a training data processor (105); and a training data memory (107) communicatively coupled to the training data processor (105), wherein the training data memory (107) stores processor-executable instructions, which, on execution, cause the training data processor (105) to:

receive structured databases schema, wherein the structured databases schema comprise information related to an enterprise;

create at least one of one or more Structured Query Language (SQL) and not only SQL (NoSQL) queries based on the structured databases schema by using predefined rules;

convert at least one of the one or more SQL and NoSQL queries into respective one or more natural language queries using a Deep Learning Neural Network (DNN) model, wherein the DNN model is trained using a first knowledge corpus (210) of a specific natural language;

create a second knowledge corpus based on the one or more natural language queries and the first knowledge corpus (210) using semantic analysis methodology; and generate training data for intents associated with each of the one or more natural language queries using the second knowledge corpus, wherein the training data is provided to one or more classification models for classifying an intent in the conversational system ($104_1$);

a processor (110); and a memory (112) communicatively coupled to the processor (110), wherein the memory (112) stores processor-executable instructions, which, on execution, cause the processor (110) to:

receive a query in a natural language from a user;

classify an intent associated with the query by using a classification model associated with the conversational system ($104_1$), wherein the classification model is trained by using the training data generated by the training data generation system (101);

map the query with at least one of one or more SQL and NoSQL queries prestored in a database using the classified intent; and provide a natural language response to the user from the database based on the mapped at least one of the one or more SQL and NoSQL queries.

7. The conversational system ($104_1$) as claimed in claim 6, wherein the training data processor (105) creates at least one of the one or more SQL and NoSQL queries by:

extracting details of a plurality of columns from each table of the structured databases schema and identifying data type corresponding to each of the plurality of columns; and creating at least one of the one or more SQL and NoSQL queries for each of the plurality of columns using the predefined rules associated with respective data type.

8. The conversational system ($104_1$) training data generation system (101) as claimed in claim 6, wherein the training data processor (105) converts at least one of the one or more SQL and NoSQL queries into the respective one or more natural language queries by:

obtaining information related to at least one of the one or more SQL and NoSQL queries, wherein the information comprises types of operations used in at least one of the one or more SQL and NoSQL queries, column names of each table used in at least one of the one or more SQL and NoSQL queries, and data type of each column name;

normalising the extracted information using at least one of stemming, spelling correction and abbreviation expansion; and generating the one or more natural language queries by assigning weights and bias to the normalized at least one of the one or more SQL and No SQL queries using the DNN model and the first knowledge corpus (210).

9. The conversational system ($104_1$) training data generation system (101) as claimed in claim 6, wherein the training data processor (105) generates the training data for intents by:

tagging the second knowledge corpus into one or more dialog tags using N-gram and topic modelling;

clustering the one or more dialog tags based on predefined parameters and labelling the clustered one or more dialog tags; and generating the training data for the intents associated with each of the one or more natural language queries based on the clustered and the labelled one or more dialog tags, wherein the intents comprise tags, patterns, responses, and context associated with the one or more natural language queries.

10. The conversational system ($104_1$) as claimed in claim 6, wherein the query includes one of a text message, and a voice message.

* * * * *